(12) United States Patent
Mandal (10) Patent No.: US 10,436,020 B2
(45) Date of Patent: Oct. 8, 2019

(54) IN-SITU BOREHOLE FLUID SPEED AND ATTENUATION MEASUREMENT IN AN ULTRASONIC SCANNING TOOL

(71) Applicant: Halliburton Energy Services, Inc., Houston, TX (US)

(72) Inventor: Batakrishna Mandal, Missouri, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 343 days.

(21) Appl. No.: 15/517,027

(22) PCT Filed: Apr. 28, 2016

(86) PCT No.: PCT/US2016/029738
§ 371 (c)(1),
(2) Date: Apr. 5, 2017

(87) PCT Pub. No.: WO2016/191026
PCT Pub. Date: Dec. 1, 2016

(65) Prior Publication Data
US 2017/0306752 A1     Oct. 26, 2017

Related U.S. Application Data

(60) Provisional application No. 62/165,707, filed on May 22, 2015.

(51) Int. Cl.
*E21B 47/10*     (2012.01)
*E21B 47/00*     (2012.01)
*G01V 1/46*      (2006.01)
*G01V 1/52*      (2006.01)

(52) U.S. Cl.
CPC ........ *E21B 47/101* (2013.01); *E21B 47/0005* (2013.01); *G01V 1/46* (2013.01); *G01V 2001/526* (2013.01)

(58) Field of Classification Search
CPC .............. E21B 47/0005; E21B 47/101; G01V 2001/526
See application file for complete search history.

(56) References Cited

U.S. PATENT DOCUMENTS

| | | | | |
|---|---|---|---|---|
| 4,255,798 A | * | 3/1981 | Havira | E21B 47/0005 181/105 |
| 4,661,933 A | * | 4/1987 | Seeman | E21B 47/082 181/102 |
| 4,757,479 A | | 7/1988 | Masson et al. | |

(Continued)

OTHER PUBLICATIONS

International Search Report and Written Opinion issued in related PCT Application No. PCT/US2016/029738 dated Aug. 9, 2016, 12 pages.

(Continued)

*Primary Examiner* — John Fitzgerald
(74) *Attorney, Agent, or Firm* — Benjamin Fite; Baker Botts L.L.P.

(57) ABSTRACT

An example casing and cement evaluation tool may include a tool body and a rotating portion coupled to the tool body. A first transducer may be coupled to the rotating portion at a radial offset from a longitudinal axis of the tool. A second transducer may be coupled to the rotating portion at a different radial offset from the longitudinal axis of the tool.

19 Claims, 5 Drawing Sheets

(56) References Cited

U.S. PATENT DOCUMENTS

| | | | | |
|---|---|---|---|---|
| 4,827,457 A * | 5/1989 | Seeman | E21B 47/082 | 181/102 |
| 4,876,672 A * | 10/1989 | Petermann | E21B 4/003 | 367/35 |
| 4,947,683 A * | 8/1990 | Minear | E21B 47/101 | 73/152.32 |
| 5,043,948 A * | 8/1991 | Hallmark | E21B 47/0002 | 181/105 |
| 5,260,911 A * | 11/1993 | Mason | G01V 1/286 | 367/57 |
| 5,333,502 A * | 8/1994 | Clark, Jr. | G01N 29/032 | 324/204 |
| 5,341,345 A * | 8/1994 | Warner | E21B 47/082 | 367/99 |
| 5,430,259 A * | 7/1995 | Warner | E21B 47/082 | 181/105 |
| 5,469,736 A * | 11/1995 | Moake | G01L 317/00 | 73/152.58 |
| 5,763,773 A * | 6/1998 | Birchak | E21B 47/0005 | 73/152.58 |
| 6,098,017 A * | 8/2000 | Brown | E21B 47/01 | 702/1 |
| 6,125,079 A * | 9/2000 | Birchak | G01V 1/44 | 181/104 |
| 6,648,083 B2 * | 11/2003 | Evans | E21B 47/00 | 175/41 |
| 7,364,007 B2 * | 4/2008 | Garcia-Osuna | E21B 47/01 | 181/108 |
| 7,418,865 B2 * | 9/2008 | Griffiths | E21B 47/082 | 181/102 |
| 7,587,936 B2 * | 9/2009 | Han | E21B 47/01 | 367/25 |
| 7,913,806 B2 * | 3/2011 | Pabon | G01V 1/523 | 166/254.2 |
| 7,950,451 B2 * | 5/2011 | Alberty | E21B 47/10 | 166/177.2 |
| 8,117,907 B2 * | 2/2012 | Han | E21B 47/082 | 73/152.58 |
| 9,366,133 B2 * | 6/2016 | DiFoggio | E21B 47/101 | |
| 9,555,444 B2 * | 1/2017 | Goodman | B06B 1/0625 | |
| 9,631,480 B2 * | 4/2017 | Cooper | E21B 47/101 | |
| 9,664,034 B2 * | 5/2017 | Mandal | E21B 49/00 | |
| 9,720,122 B2 * | 8/2017 | DiFoggio | E21B 47/011 | |
| 2004/0095847 A1 * | 5/2004 | Hassan | E21B 47/101 | 367/25 |
| 2005/0205248 A1 | 9/2005 | Barolak et al. | | |
| 2005/0259512 A1 * | 11/2005 | Mandal | E21B 47/082 | 367/10 |
| 2006/0067162 A1 * | 3/2006 | Blankinship | E21B 47/0005 | 367/35 |
| 2006/0101916 A1 * | 5/2006 | Griffiths | E21B 47/082 | 73/597 |
| 2006/0133205 A1 | 6/2006 | Van Kuijk et al. | | |
| 2008/0186805 A1 * | 8/2008 | Han | E21B 47/01 | 367/35 |
| 2009/0201764 A1 * | 8/2009 | Liu | G01V 1/40 | 367/27 |
| 2010/0258303 A1 * | 10/2010 | Alberty | E21B 47/08 | 166/244.1 |
| 2013/0021874 A1 * | 1/2013 | Hartog | E21B 47/101 | 367/31 |
| 2014/0071790 A1 * | 3/2014 | Mandal | G01N 29/11 | 367/27 |
| 2014/0301164 A1 | 10/2014 | Mandal | | |
| 2015/0003203 A1 | 1/2015 | Froelich | | |
| 2015/0198030 A1 * | 7/2015 | Tello | G01V 1/50 | 367/86 |
| 2015/0218930 A1 * | 8/2015 | Zeroug | E21B 47/0005 | 367/26 |
| 2016/0025884 A1 * | 1/2016 | DiFoggio | E21B 47/011 | 367/25 |
| 2016/0054461 A1 * | 2/2016 | Blankinship | G01V 1/02 | 367/13 |
| 2016/0299050 A1 * | 10/2016 | Dorovsky | E21B 25/00 | |
| 2017/0183961 A1 * | 6/2017 | Mandal | E21B 47/0005 | |
| 2017/0205524 A1 * | 7/2017 | Mandal | E21B 47/0005 | |
| 2017/0254183 A1 * | 9/2017 | Vasques | E21B 41/0085 | |

OTHER PUBLICATIONS

International Preliminary Report of Patentability issued in related Application No. PCT/US2016/029738, dated Dec. 7, 2017, 9 pages.

\* cited by examiner

IN-SITU BOREHOLE FLUID SPEED AND ATTENUATION MEASUREMENT IN AN ULTRASONIC SCANNING TOOL

CROSS-REFERENCE TO RELATED APPLICATION

The present application is a U.S. National Stage Application of International Application No. PCT/US2016/029738 filed Apr. 28, 2016 which claims priority to U.S. Provisional Patent Application No. 62/165,707 filed May 22, 2015, both of which are incorporated herein by reference in their entirety for all purposes.

BACKGROUND

The present disclosure relates generally to well drilling and completion operations and, more particularly, to in-situ borehole fluid speed and attenuation measurement in an ultrasonic scanning tool.

Well drilling and completion operations sometimes require the use of casings within a wellbore in a subterranean formation to ensure that the wellbore does not collapse once it is drilled and that sensitive areas of the formation are protected and isolated. In most cases the casings are secured in the wellbore using a cement layer that fills an annulus between and bonds to both the casing and the formation. The strength of both cement bonds is important to the integrity of the well. Measuring cement impedance can provide information about the strength of the cement bonds.

Some casing and cement evaluation tools transmit an acoustic pulse into the casing and cement layer, and receive an echo signal of that pulse. The echo signal may include reflections and reverberations caused by the casing, the cement layer, and an interface between the two. These reflections and reverberations may be used, in part, to calculate downhole characteristics, including the cement impedance. In some instances, borehole fluids, such as drilling mud and other formation fluids, may be present within the casing such that the acoustic pulse must be transmitted through the borehole fluid. The fluid speed and attenuation characteristics of the borehole fluid may alter or otherwise affect the initial acoustic pulse and the reflections and reverberations. Typical calculations to determine cement impedance, for instance, account for these affects, but the accuracy of the resulting determination depends, in part, on the accuracy of the fluid speed and attenuation values used in the calculations. In-situ measurements can be difficult for heavy mud, which can clog or otherwise cost sensors, and experimental estimations fail to account for the dynamic conditions downhole.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling and completion operations and, more particularly, to in-situ borehole fluid speed and attenuation measurement in an ultrasonic scanning tool.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot/tractor or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"), and wireline. In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 1:
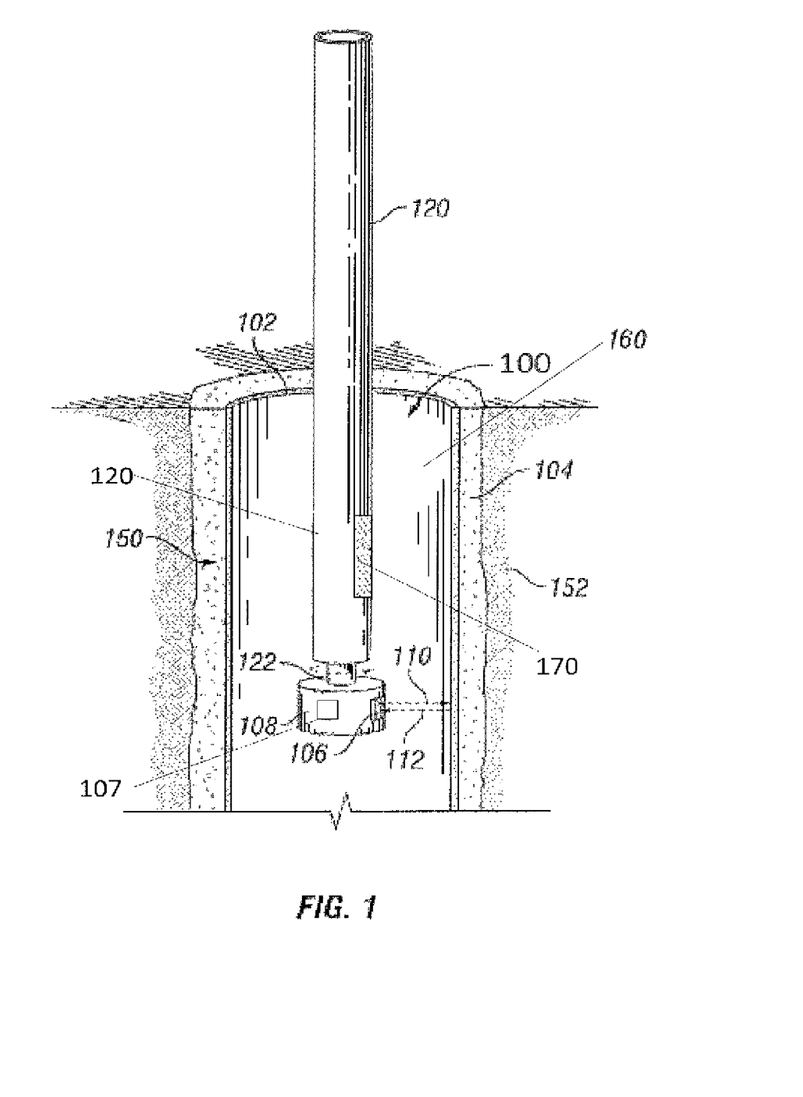
FIG. 1 is a diagram illustrating an example casing and cement evaluation tool, according to aspects of the present disclosure.

FIG. 1 is a diagram illustrating an example casing and cement evaluation tool 100 with radially offset transducers 106 for use in in-situ fluid speed and attenuation measurements, according to aspects of the present disclosure. The tool 100 may be suspended (e.g. via wireline, slickline, coiled tubing, drill pipe/tubing, downhole tractor, or the like) within a wellbore 150 in a subterranean formation 152. As depicted, the tool 100 may be positioned within a casing 102 that is secured in the wellbore 150 by a cement layer 104 that substantially fills the annulus between the casing 102 and the wellbore 150. The casing 102 is at least partially filled with fluid 160, which may comprise drilling fluid, water, and/or fluids from the formation 152. The casing 102 may comprise a metal tubular with a pre-determined length and diameter that is specifically selected for a particular depth in the formation 152. Although only one casing 102 is shown in FIG. 1, multiple casings may be used, including in a telescopic orientation where casings with progressively smaller diameters are used as the wellbore 150 extends further into the formation 152. The casing 112 may prevent the wellbore 150 from collapsing, prevent sensitive formation strata from exposure to downhole fluids, and prevent unwanted formation fluids from entering the wellbore 150.

The tool 100 comprises an elongated tool body 120 comprising a rotating portion 108 with one or more acoustic transducers 106 coupled thereto. Example acoustic transducers include, but are not limited to, piezoelectric crystals, geophones, electromagnetic elements, etc. As depicted, the rotating portion 108 comprises a rotating head positioned at a distal end of the elongated tool body 120. In other embodiments, the rotation portion 108 may be positioned at one or more intermediate portions of the elongated tool body 120, which may provide greater flexibility with respect to the tool design. As depicted, the diameter of the rotating portion 108 is larger than the diameter of the elongated tool body 120, but other configurations are possible within the scope of the present disclosure.

The rotating portion 108 may be driven by an electric motor (not shown) or another suitable drive mechanism that provides for the controlled rotational movement of the rotating portion 108 with respect to the tool 100. As depicted, the rotating portions 108 may be driven through a shaft 122 connecting the rotating portion 108 to a drive mechanism within the elongated tool body 120. Power for the drive mechanism and other elements within the tool 100 may be provided, for instance, through the means of suspension, or by one or more power sources, e.g., batteries, capacitors, generators, within the tool 100.

In use, the tool 100 may function by transmitting a directional acoustic pulse 110 from one or more transducers 106 and 107 to the casing 102 at a first azimuthal location with respect to the tool 100. The directional acoustic pulse 110 may be characterized by an amplitude. The directional acoustic pulse 110 is not limited with respect to frequency and can but is not required to be an ultrasonic pulse. That pulse 110 may contact, be reflected by, and/or cause to reverberate the casing 102, the cement layer 104, and the interface between the casing 102 and the cement layer 104. These reflections and reverberations may comprise an echo signal 112 that is received by the transducer 106 that transmitted the ultrasonic pulse. The echo signal 112 also may be characterized by an amplitude, with the difference between the amplitude of the echo signal 112 and the amplitude of the directional acoustic pulse 110 corresponding to an attenuation of the directional acoustic pulse 110.

After the echo signal 112 is received from the first azimuthal location, the head 108 may be rotated to a second azimuthal location within the wellbore 150. Another pulse may then be transmitted from one or more of the transducers 106, and a corresponding echo signal may be received at one or more of the transducers 106. The head 108 then may be rotated to a third azimuthal location within the wellbore 150 and yet another pulse may then be transmitted from the transducer 106, and a corresponding echo signal may be received at the transducer 106. The first, second and third azimuthal locations may but are not required to be equal rotational intervals with respect to the tool 100. For instance, the angular difference between the azimuthal locations may be modified in real time depending on the signals received and the granularity of the resulting measurements, with smaller rotational intervals corresponding to a higher granularity.

In certain embodiments, this process may continue until the head 108 has completed a rotation, at which point the tool 100 may be positioned at a different depth. The group of azimuthal measurements taken at a particular depth may be referred to as a "scan." The number of azimuthal measurements taken to complete a scan may depend, for instance, on the granularity required by the combined measurements as well as downhole conditions. Although not shown, instead of a rotating head, the whole tool 100 or a portion thereof having the transducer 106 can be rotated to accomplish a similar azimuthal scan. For example, if the tool 100 is conveyed into the wellbore 150 via drill pipe, the drill pipe could be rotated to in-turn rotate the tool 100 and thereby the transducer 106.

In certain embodiments, each echo signal received by the one or more transducers 106 may be transmitted to one or more control systems (not shown) associated with the tool 100, where they can be processed, for example, for the purposes of controlling or altering the configuration of the tool 100 or elements of the tool 100, or for the purpose of determining physical characteristics (e.g., impedance, thickness, slowness, reflectance) of the casing 102 and cement layer 104. As used herein a control system may comprise an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), field programmable gate arrays (FPGA), or any other digital or analog circuitry configured to interpret and/or execute program instructions and/or process data. The one or more control systems associated with the tool 100 could be, for example, wholly within the tool 100, located at the surface, or a combination of the two (e.g. some processing occurring downhole and some done at the surface.

Attenuation conditions with the wellbore 150 may affect the signal quality of the echo signal. For instance, the speed and attenuation characteristics of the fluid 160 within the casing 102 may affect the pulses 110 by skewing or otherwise reducing the amplitude of the pulses, which in turn may affect the amplitude of the echo signal 112. If the pulse 110 is attenuated too much, the echo signal 112 may have insufficient amplitude to provide reliable signal quality. Additionally, the speed and attenuation characteristics of the fluid 160 may alter the frequency response of the pulses 110 and the echo signal 112, which may skew the physical characteristics values calculated from the signals 112.

The effects of the speed and attenuation characteristics of the fluid 160 on the signals can be accounted for when the characteristics of the casing 102 and cement 104 are calculated or determined, provided values for the speed and attenuation characteristics are known. Typically, these values are either estimated based on experimental values, or measured in-situ using a dedicated transducer with a known offset distance from a reference block, as is the case in the mud cell 170 present in the tool 100. Estimated fluid speed and attenuation values, however, can fail to account for real-time dynamics in the fluid. Additionally, although mud cells can provide accurate measurements with respect to certain fluids, they have difficulty measuring fluid speed and attenuation of heavy muds used in deep sea drilling or other managed pressure drilling applications due to a tendency to become coated.

According to aspects of the present disclosure, in-situ fluid speed and attenuation measurements in all types of fluids may be facilitated through the use of multiple transducers with different, known radial offsets with respect to the longitudinal axis of the tool. In the embodiment shown, the tool comprises a first transducer 106 located at a first angular orientation with respect to the tool 100 and a second transducer 107 located at a second angular orientation with respect to the tool 100. As will be depicted and explained in detail below, the first transducer 106 may have a different radial displacement than the second transducer 107 with respect to the longitudinal axis to the tool 10, such that the distances between the transducers 106/107 and the casing 102 differ. The transducers 106/107 may be coupled to an outer surface of the rotating portion 108, positioned within cavities in the rotating portion 108, or coupled to the rotating portion 108 and tool 100 in any other suitable manner. Additionally, it should be appreciated that the number and orientation of transducers 106/107 depicted are merely illustrative and not meant to be limiting.

In contrast to the dedicated transducer in the mud cell 170, the transducers 106/107 may facilitate fluid speed and attenuation calculations while transmitting acoustic pulses and receiving echo signals necessary to calculate the cement impedance and other characteristics of the casing 102 and cement layer 104. In addition to facilitating fluid speed and attenuation calculations of the fluid 160, the use of multiple transducers 106 may increase the speed with which 360-degree scans of the casing 102 and cement layer 104 can be performed, as well as facilitate uniform rotation without the use of a counterbalance within the rotating head 108.

Figure 2:
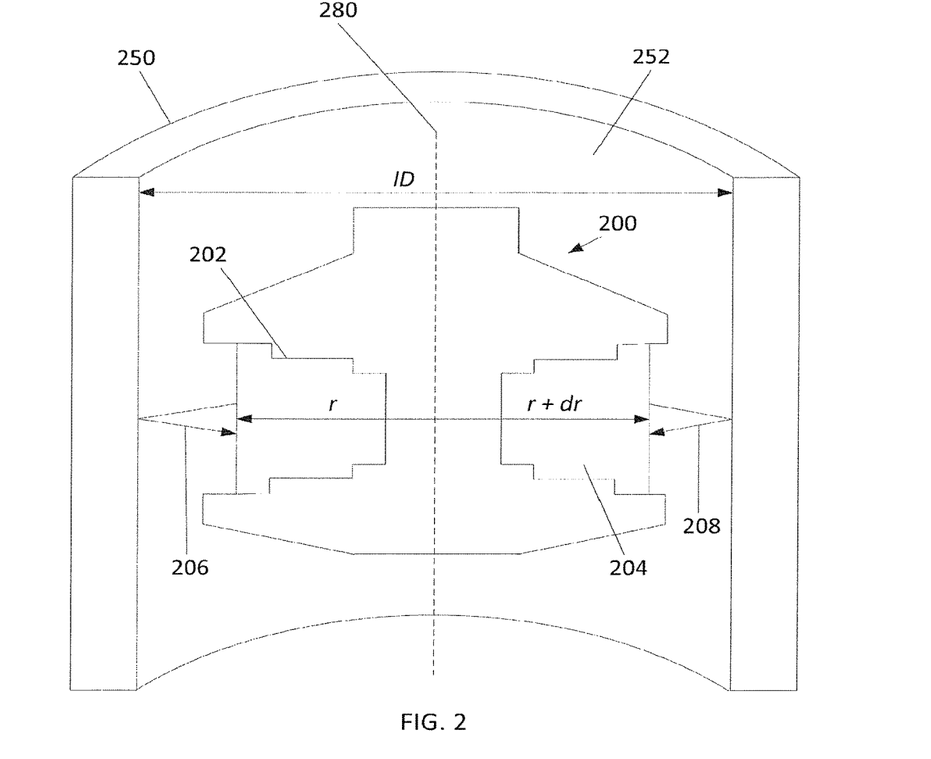
FIG. 2 is a diagram of an example portion of a casing and cement evaluation tool with radially offset transducers, according to aspects of the present disclosure.

FIG. 2 is a diagram of an example portion of a casing and cement evaluation tool with radially offset transducers, according to aspects of the present disclosure. The portion of the tool comprises a rotating head 200 similar to the rotating head described above. As depicted, two transducers 202 and 204 are coupled to the rotating head, similar to the rotating portion 108 of FIG. 1, with each having a different radial offset with respect to a rotational axis 280 of the head 200. For instance, transducer 202 is at a radial offset r measured from the axis 280 to the face of the transducer 202. Likewise, transducer 204 is at a radial offset r+dr measured from the axis 280 to the face of the transducer 204. The value for the radial offsets can be arbitrary provided they differ. Additionally, although the transducers 202 and 204 are shown coupled to the rotating head at opposite angular orientations with respect to the axis 280 of the head 200, other configurations are possible, including configurations with additional transducers at equal angular offsets around the head 200, configurations in which the transducers 202 and 204 may be positioned at different angular orientations than what is shown, etc.

In use, acoustic pulses 206 and 208 may be transmitted from the transducers 202 and 204 toward a casing 250 with an inner diameter ID in which the transducers 202 and 204 are positioned. These acoustic pulses may travel through fluid 252 within the casing 250. The acoustic pulses may be transmitted simultaneously, but some offset in time is preferred to avoid interference or the introduction of unwanted noise. As depicted, a first pulse 206 is transmitted from the transducer 202 and the echo signal is received at the transducer 202 at time an arrival time $t_1$. This time may be determined by a control system at or away from the tool with an internal clock based on when an excitation pulse was sent to the transducer 202 and when the echo signal was received from the transducer 202. Using similar steps, a second pulse 208 may be transmitted from the transducer 204 and the echo signal may be receiver at the transducer 204 at an arrival time $t_2$. Based on the determined arrival times $t_1$ and $t_2$, and the otherwise known variables described above, the fluid speed may be calculated at the control system or another information handling system using the following equations:

$$\text{fluid speed} = \frac{2(ID - (2r + dr))}{t_1 + t_2} \qquad (1)$$

$$\text{fluid speed} = \frac{2dr}{t_1 + t_2} \qquad (2)$$

With respect to attenuation, the amplitude of the echo signal may be compared to the excitation pulse to determine attenuation by the fluid 252. This may include transforming the echo signals and excitation pulses into frequency domain, such as through a Fourier transform, by the control system or other information handling system, and comparing their frequency spectra. In certain embodiments, a control system may cause the transducers 202 and 204 to transmit signals with different frequencies. The echo signals corresponding to transmitted signals may be received by the transducers 202 and 204 and recorded by the control unit. The control unit or another information handling system may then transform the echo signals into frequency domain such that the frequency spectra of the echo signals may be examined with respect to the frequency spectra of the transmitted acoustic pulse to determine a frequency dependent attenuation response of the fluid 252.

Figure 3:
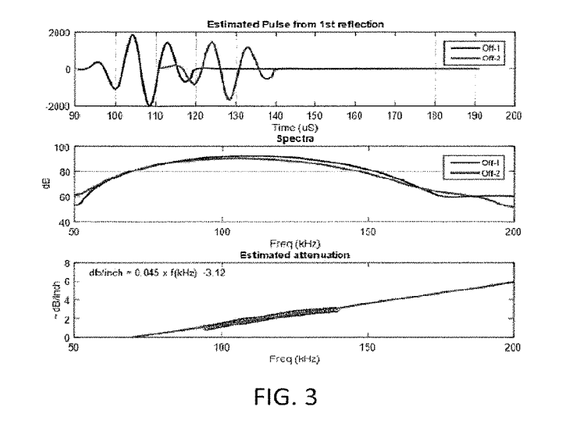
FIG. 3 is a set of graphs identifying the example pulses received by offset transducers and the corresponding attenuation determinations, according to aspects of the present disclosure.

FIG. 3 is a set of graphs identifying the example echo signals received by offset transducers and the corresponding attenuation determinations, according to aspects of the present disclosure. Specifically, the graphs identify example echo signals and corresponding attenuation determinations when identical acoustic pulses are transmitted and received by both offset transducers in identical fluid compositions. The top graph identifies two echo signals received by transducers with different offsets. As can be seen, the echo signals have similar shapes, but are received at different times and have different amplitudes, both of which are functions of the different radial offsets. The middle graph compares the frequency spectra of the received signals. Notably, the frequency spectra are similar, which would be expected when the acoustic pulses are transmitted into identical fluid compositions. The bottom spectra identify the frequency dependent estimated attenuation for the example fluid based on the received echo signals at the offset transducers.

Figure 4A:
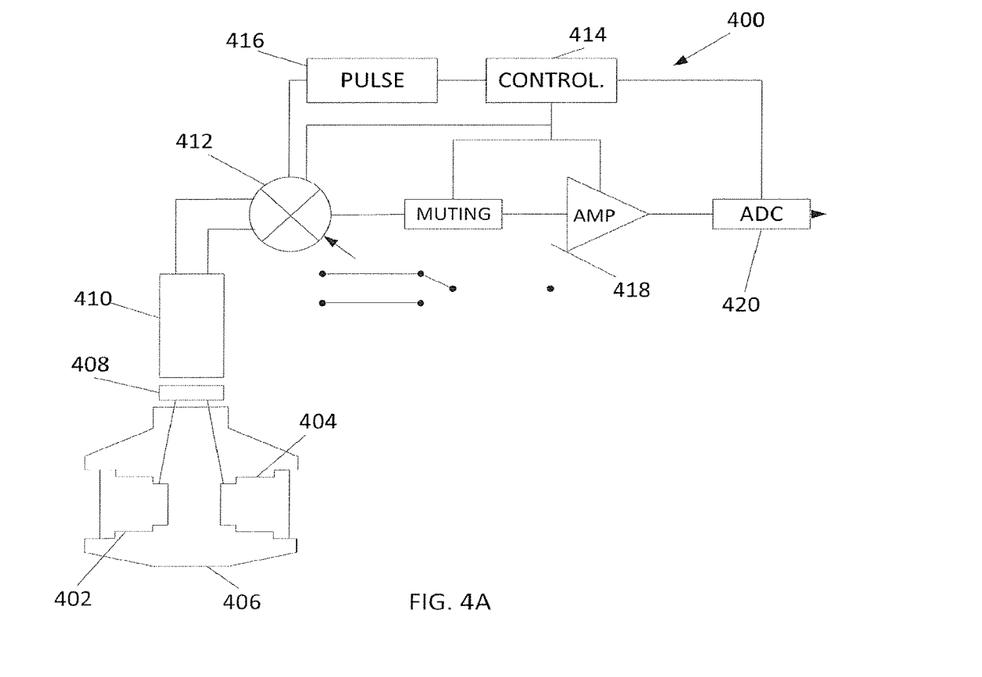
FIGS. 4a and 4b are block diagrams of example firing systems for casing and cement detection tools with multiple, radially offset transducers, according to aspects of the present disclosure.
Figure 4B:
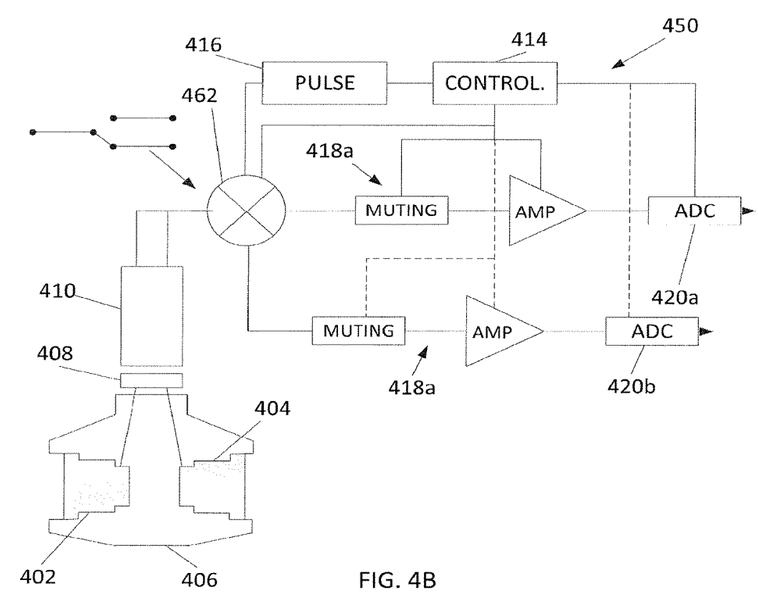

FIGS. 4a and 4b are block diagrams of example firing systems 400 and 450 for a casing and cement detection tool with multiple, radially offset transducers 402 and 404, according to aspects of the present disclosure. As depicted, the transducers 402 and 404 are positioned within a rotating head 406 and communicable coupled to the firing systems 400 and 450 through a slip ring assembly 408 between the rotating head 406 and a primary tool body 410. The firing systems 400 and 450 may be at least partially located within the primary tool body 410 and may control the transmission, reception, and/or processing of the acoustic pulses and echo signals. In firing system 400, the transducers 402 and 404 may be coupled to a high-speed, high-voltage switch 412. The switch 412 may only allow one transducer to be coupled to the remainder of the firing system 400 at any time, yet provide fast switching so that the transducers 402 and 404 can be used serially in rapid succession. In firing system 450, the two transducers 402/404 may be connected through a high-speed, high-voltage switch 462 such that the transducers 402/404 can be fired at the same time and coupled to one or more receiver channels within the firing system 450.

The firing system 400 may comprise at least one processor or other control device 414. Example processors and control devices include microprocessors, microcontrollers, digital signal processors (DSP), application specific integrated circuits (ASIC), field programmable gate array (FPGA), or any other digital or analog circuitry configured to interpret and/or execute program instructions and/or process data. As depicted, the device 414 comprises a FPGA that is coupled to transmitter circuitry 416, receiver circuitry 418, and the switch 412. The FPGA 414 may transmit a signal to the switch 412 to select a particular transducer, signal the transmitter circuitry 416 to output a voltage pulse to the selected transducer, and prevent the receiver circuitry 418 from receiving the initial voltage pulse through the mute block. After the selected transducer generates the acoustic pulse in response to the voltage pulse, the FPGA 414 may unmute the receiver circuitry 418 so that it can receive the echo signal from the selected transducer. That received echo signal may be amplified within the receiver circuitry and digitized by an analog to digital converter 420. The digitized signal may be transmitted to a processor or other information handling system (not shown) communicably coupled to the firing system 400/transducers to perform the fluid speed and attenuation calculations described above and/or calculations with respect to cement impedance or other downhole characteristics. Once the echo signal is received, the process may be performed with respect to the other transducer. In alternative embodiments, multiple firing systems may be used, instead of a single firing system connected to multiple transducers by the switch 412. Additionally, other firing system configurations are possible.

The firing system 450 comprises similar components to the firing system 400 with the exception of the high voltage switch 462 and the receiver circuitry. In contrast to the firing system 400, the system 450 may receive inputs from the transducers 402/404 through a single input line connected to switch 462, with the switch responsible for selecting which receiver channel to which the received signals from the transducers 402/404 should be directed. As depicted, the receiver channels comprise duplicate receiver circuitry 418a/b, both comprising a muting circuit and an amplifier coupled to the control device 414. In use, both transducers 402/404 may generate acoustic pulses in response to a signal from the transmitter circuitry 416. The switch 462, which may be controller by the control device 414, may direct the echo signals received at transducer 402 to receiver channel 418a and may direct the echo signals receiver at transducer 404 to receiver channel 418b. Other configurations and functionalities are possible.

Figures 5, 6:
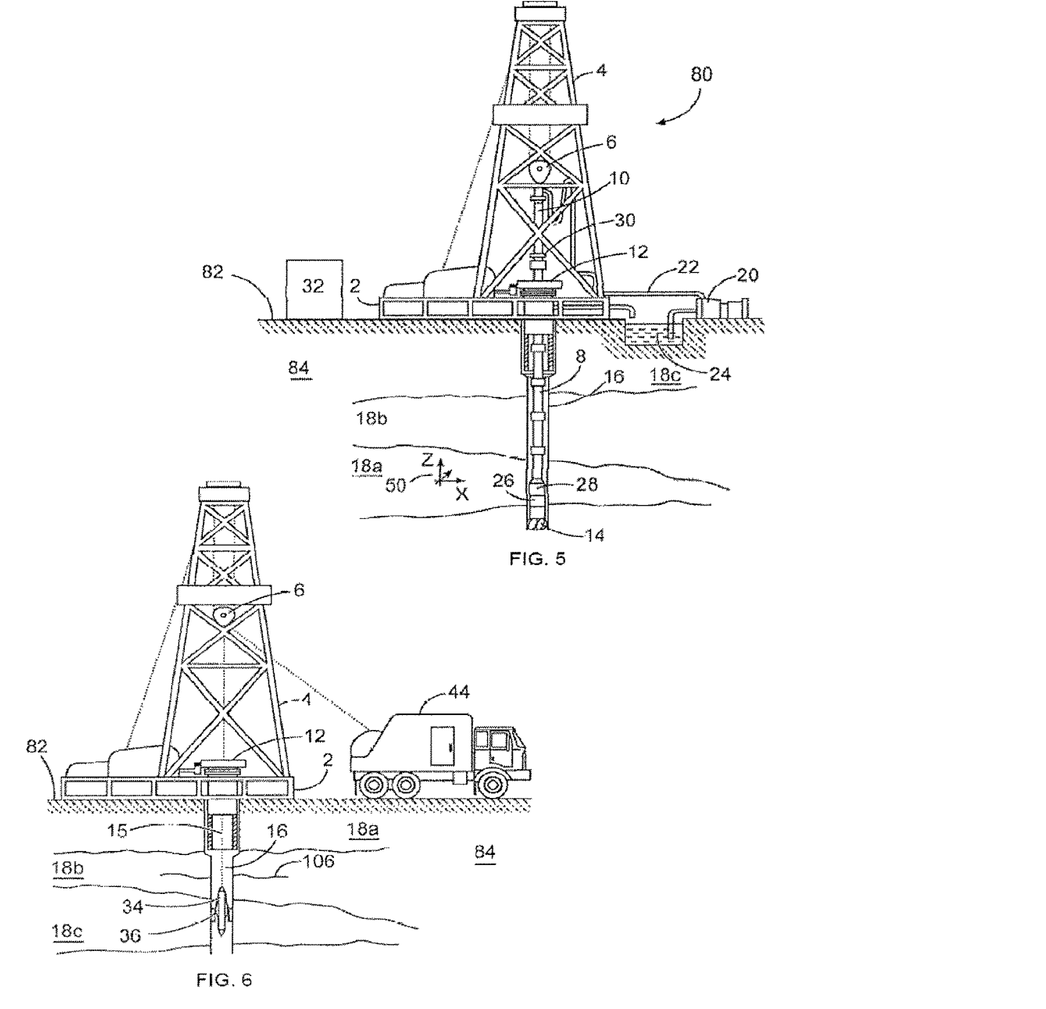
FIG. 5 is a diagram showing an illustrative drilling system, according to aspects of the present disclosure.
FIG. 6 is a diagram showing an illustrative wireline logging system, according to aspects of the present disclosure.

One or more of the apparatus, systems, and/or methods described above may be incorporated into/with a wireline tool/sonde for wireline logging operation or into/with one or more LWD/MWD tools for drilling operations. FIG. 5 is a diagram showing a subterranean drilling system 80 incorporating at least one acoustic LWD/MWD tool 26, according to aspects of the present disclosure. The drilling system 80 comprises a drilling platform 2 positioned at the surface 82. As depicted, the surface 82 comprises the top of a formation 84 containing one or more rock strata or layers 18*a-c*, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, hack to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the acoustic tool 26. In one or more embodiments, the tool 26 may comprise acoustic pulse excitation and echo/reflection reception functionality that will be described in detail below. As the bit extends the borehole 16 through the formations 18, the tool 26 may collect measurements relating to borehole 16 and the formation 84. In certain embodiments, the orientation and position of the acoustic tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from acoustic tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may comprise an information handling system communicably coupled to the surface receiver 30 and may receive measurements from the acoustic tool 26 and/or transmit commands to the acoustic tool 26 though the surface receiver 30. The surface control unit 32 may also receive measurements from the acoustic tool 26 when the acoustic tool 26 is retrieved at the surface 102. As is described above, the surface control unit 32 may process some or all of the measurements from the acoustic tool 26 to determine certain parameters of downhole elements, including the borehole 16 and formation 84.

At various times during the drilling process, the drill string 8 may be removed from the borehole 16 as shown in FIG. 6. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise an acoustic tool 36, similar to the acoustic tool 26 described above. The tool 36 may be communicatively coupled to the cable 15. A logging facility 44 (shown in FIG. 5 as a truck, although it may be any other structure) may collect measurements from the acoustic tool 36, and may include computing facilities (including, e.g., a control unit/information handling system) for controlling, processing, storing, and/or visualizing some or all of the measurements gathered by the tool 36. The computing facilities may be communicatively coupled to the acoustic tool 36 by way of the cable 15. In certain embodiments, the control unit 32 may serve as the computing facilities of the logging facility 44.

An example casing and cement evaluation tool may include a tool body and a rotating portion coupled to the tool body. A first transducer may be coupled to the rotating portion at a radial offset from a longitudinal axis of the tool. A second transducer may be coupled to the rotating portion at a different radial offset from the longitudinal axis of the tool.

In one or more embodiments described in the preceding paragraph, the first transducer and the second transducer are offset 180° with respect to the rotating portion.

In one or more embodiments described in the preceding two paragraphs, the rotating portion comprises a rotating head positioned at a distal end of the tool body and rotated by a drive mechanism located within the tool body.

In one or more embodiments described in the preceding three paragraphs, an information handling system may be communicably coupled to the first and second transducers and configured to receive from the first transducer a first echo signal corresponding to a first acoustic pulse transmitted by the first transducer; receive from the second transducer a second echo signal corresponding to a second acoustic pulse transmitted by the second transducer; and determine a fluid speed of a borehole fluid in which the tool body is positioned based, at least in part, on the received first echo signal and the received second echo signal.

In one or more embodiments described in the preceding four paragraphs, the information handling system is configured to determine the fluid speed of the borehole fluid based, at least in part, on the received first echo signal and the received second echo signal by performing the following steps: determine a first arrival time associated with the first echo signal; determine a second arrival time associated with the second echo signal; and determine the fluid speed based, at least in part, on the first arrival time and the second arrival time.

In one or more embodiments described in the preceding five paragraphs, the information handling system is configured to determine the fluid speed based, at least in part, on the first arrival time and the second arrival time using the following equations:

$$\text{fluid speed} = \frac{2(ID - (2r + dr))}{t_1 + t_2} \qquad (1)$$

$$\text{fluid speed} = \frac{2dr}{t_1 + t_2} \qquad (2)$$

wherein ID correspond to an inner diameter of a casing in which the tool body is positioned; $t_1$ corresponds to the first arrival time; $t_2$ corresponds to the second arrival time; r corresponds to the radial offset of the first transducer; and dr corresponds to the difference between the radial offset of the first transducer and the radial offset of the second transducer.

In one or more embodiments described in the preceding six paragraphs, the information handling system is further configured to determine a frequency-based attenuation response of the borehole fluid based, at least in part, on the first echo signal and the second echo signal.

In one or more embodiments described in the preceding seven paragraphs, the information handling system is configured to determine the frequency-based attenuation response of the borehole fluid based, at least in part, on the first echo signal and the second echo signal by performing the following steps: transform the first and second echo signals into the frequency domain; respectively compare the transformed first and second echo signals to the frequency spectra of the first acoustic pulse and the second acoustic pulse.

In one or more embodiments described in the preceding eight paragraphs, a slip ring may be between the tool body and the rotating portion of the tool body.

In one or more embodiments described in the preceding nine paragraphs, a field programmable gate array may control, in part, the first transducer and the second transducer.

An example method may include transmitting a first acoustic pulse from a first transducer positioned within borehole fluid, wherein the first transducer is coupled to a rotating portion of a downhole tool at a radial offset from a longitudinal axis of the tool. A first echo signal corresponding to the first acoustic pulse may be received at the first transducer. A second acoustic pulse may be transmitted from a second transducer positioned within borehole fluid, wherein the second transducer is coupled to the rotating portion of the downhole tool at a different radial offset from a longitudinal axis of the tool. A second echo signal corresponding to the second acoustic pulse may be received at the second transducer. A fluid speed of the borehole fluid may be determined based, at least in part, on the first echo signal and the second echo signal.

In one or more embodiments described in the preceding paragraph, the first transducer and the second transducer are offset 180° with respect to the rotating portion.

In one or more embodiments described in the preceding two paragraphs, the rotating portion comprises a rotating head positioned at a distal end of the tool body and rotated by a drive mechanism located within the tool body.

In one or more embodiments described in the preceding three paragraphs, determining the fluid speed of the borehole fluid based, at least in part, on the first echo signal and the second echo signal comprises determining a first arrival time associated with the first echo signal; determining a second arrival time associated with the second echo signal; and determining the fluid speed based, at least in part, on the first arrival time and the second arrival time.

In one or more embodiments described in the preceding four paragraphs, determining the fluid speed based, at least in part, on the first arrival time and the second arrival time comprises determining the fluid speed using the following equations:

$$\text{fluid speed} = \frac{2(ID - (2r + dr))}{t_1 + t_2} \quad (1)$$

$$\text{fluid speed} = \frac{2dr}{t_1 + t_2} \quad (2)$$

wherein ID correspond to an inner diameter of a casing in which the tool body is positioned; $t_1$ corresponds to the first arrival time; $t_2$ corresponds to the second arrival time; r corresponds to the radial offset of the first transducer; and dr corresponds to the difference between the radial offset of the first transducer and the radial offset of the second transducer.

In one or more embodiments described in the preceding five paragraphs, a frequency-based attenuation response of the borehole fluid may be determined based, at least in part, on the first echo signal and the second echo signal.

In one or more embodiments described in the preceding six paragraphs, determining the frequency-based attenuation response of the borehole fluid based, at least in part, on the first echo signal and the second echo signal comprises transforming the first and second echo signals into the frequency domain; and respectively comparing the transformed first and second echo signals to the frequency spectra of the first acoustic pulse and the second acoustic pulse.

In one or more embodiments described in the preceding seven paragraphs, the tool comprises a slip ring between the tool body and the rotating portion of the tool body.

In one or more embodiments described in the preceding eight paragraphs, the tool comprises a field programmable gate array that controls, in part, the first transducer and the second transducer.

In one or more embodiments described in the preceding nine paragraphs, at least one characteristic of a casing in which the tool is positioned, or of a cement layer between the casing and a borehole, may be determined based, at least in part, on the determined fluid speed.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A casing and cement evaluation tool, comprising:
   a tool body;
   a rotating portion coupled to the tool body;
   a first transducer coupled to the rotating portion at a radial offset from a longitudinal axis of the tool and at a longitudinal position on the rotating portion of the tool body; and
   a second transducer coupled to the rotating portion at a different radial offset from the longitudinal axis of the tool and at the same longitudinal position as the first transducer.

2. The casing and cement evaluation tool of claim 1, wherein the first transducer and the second transducer are offset 180° with respect to the rotating portion.

3. The casing and cement evaluation tool of claim 1, wherein the rotating portion comprises a rotating head positioned at a distal end of the tool body and rotated by a drive mechanism located within the tool body.

4. The casing and cement evaluation tool of claim 1, further comprising a slip ring between the tool body and the rotating portion of the tool body.

5. The casing and cement evaluation tool of claim 1, further comprising a field programmable gate array that controls, in part, the first transducer and the second transducer.

6. The casing and cement evaluation tool of claim 1, further comprising an information handling system communicably coupled to the first and second transducers and configured to:
  receive from the first transducer a first echo signal corresponding to a first acoustic pulse transmitted by the first transducer;
  receive from the second transducer a second echo signal corresponding to a second acoustic pulse transmitted by the second transducer; and
  determine a fluid speed of a borehole fluid in which the tool body is positioned based, at least in part, on the received first echo signal and the received second echo signal.

7. The casing and cement evaluation tool of claim 6, wherein the information handling system is configured to determine the fluid speed of the borehole fluid based, at least in part, on the received first echo signal and the received second echo signal by performing the following steps:
  determine a first arrival time associated with the first echo signal;
  determine a second arrival time associated with the second echo signal; and
  determine the fluid speed based, at least in part, on the first arrival time and the second arrival time.

8. The casing and cement evaluation tool of claim 7, wherein the information handling system is configured to determine the fluid speed based, at least in part, on the first arrival time and the second arrival time using the following equations:

$$\text{fluid speed} = \frac{2(ID - (2r + dr))}{t_1 + t_2} \quad (1)$$

$$\text{fluid speed} = \frac{2dr}{t_1 + t_2} \quad (2)$$

wherein ID correspond to an inner diameter of a casing in which the tool body is positioned; $t_1$ corresponds to the first arrival time; $t_2$ corresponds to the second arrival time; r corresponds to the radial offset of the first transducer; and dr corresponds to the difference between the radial offset of the first transducer and the radial offset of the second transducer.

9. The casing and cement evaluation tool of claim 6, wherein the information handling system is further configured to determine a frequency-based attenuation response of the borehole fluid based, at least in part, on the first echo signal and the second echo signal.

10. The casing and cement evaluation tool of claim 9, wherein the information handling system is configured to determine the frequency-based attenuation response of the borehole fluid based, at least in part, on the first echo signal and the second echo signal by performing the following steps:
  transform the first and second echo signals into the frequency domain;
  respectively compare the transformed first and second echo signals to the frequency spectra of the first acoustic pulse and the second acoustic pulse.

11. A method, comprising:
  transmitting a first acoustic pulse from a first transducer positioned within borehole fluid, wherein the first transducer is coupled to a rotating portion of a downhole tool at a radial offset from a longitudinal axis of the tool;
  receiving at the first transducer a first echo signal corresponding to the first acoustic pulse;
  transmitting a second acoustic pulse from a second transducer positioned within borehole fluid, wherein the second transducer is coupled to the rotating portion of the downhole tool at a different radial offset from a longitudinal axis of the tool;
  receiving at the second transducer a second echo signal corresponding to the second acoustic pulse;
  determining a frequency-based attenuation response of the borehole fluid based, at least in part, on the first echo signal and the second echo signal.

12. The method of claim 11, wherein the first transducer and the second transducer are offset 180° with respect to the rotating portion.

13. The method of claim 11, wherein the rotating portion comprises a rotating head positioned at a distal end of the tool body and rotated by a drive mechanism located within the tool body.

14. The method of claim 11, further comprising determining a fluid speed of the borehole fluid based, at least in part, on the first echo signal and the second echo signal.

15. The method of claim 11, wherein determining the frequency-based attenuation response of the borehole fluid based, at least in part, on the first echo signal and the second echo signal comprises transforming the first and second echo signals into the frequency domain; and respectively comparing the transformed first and second echo signals to the frequency spectra of the first acoustic pulse and the second acoustic pulse.

16. The method of claim 11, wherein the tool comprises a slip ring between the tool body and the rotating portion of the tool body.

17. The method of claim 11, wherein the tool comprises a field programmable gate array that controls, in part, the first transducer and the second transducer.

18. The method of claim 11, further comprising determining a fluid speed based, at least in part, on the first echo signal and the second echo signal, wherein determining the fluid speed of the borehole fluid comprises
  determining a first arrival time associated with the first echo signal;
  determining a second arrival time associated with the second echo signal; and
  determining the fluid speed based, at least in part, on the first arrival time and the second arrival time.

19. The method of claim 18, wherein determining the fluid speed based, at least in part, on the first arrival time and the second arrival time comprises determining the fluid speed using the following equations:

$$\text{fluid speed} = \frac{2(ID - (2r + dr))}{t_1 + t_2} \quad (1)$$

-continued $$\text{fluid speed} = \frac{2dr}{t_1 + t_2} \qquad (2)$$

wherein ID correspond to an inner diameter of a casing in which the tool body is positioned; $t_1$ corresponds to the first arrival time; $t_2$ corresponds to the second arrival time; r corresponds to the radial offset of the first transducer; and dr corresponds to the difference between the radial offset of the first transducer and the radial offset of the second transducer.

\* \* \* \* \*